C. C. FLAMBO.
SPRING TRIP.
APPLICATION FILED APR. 14, 1909.
959,727.
Patented May 31, 1910.
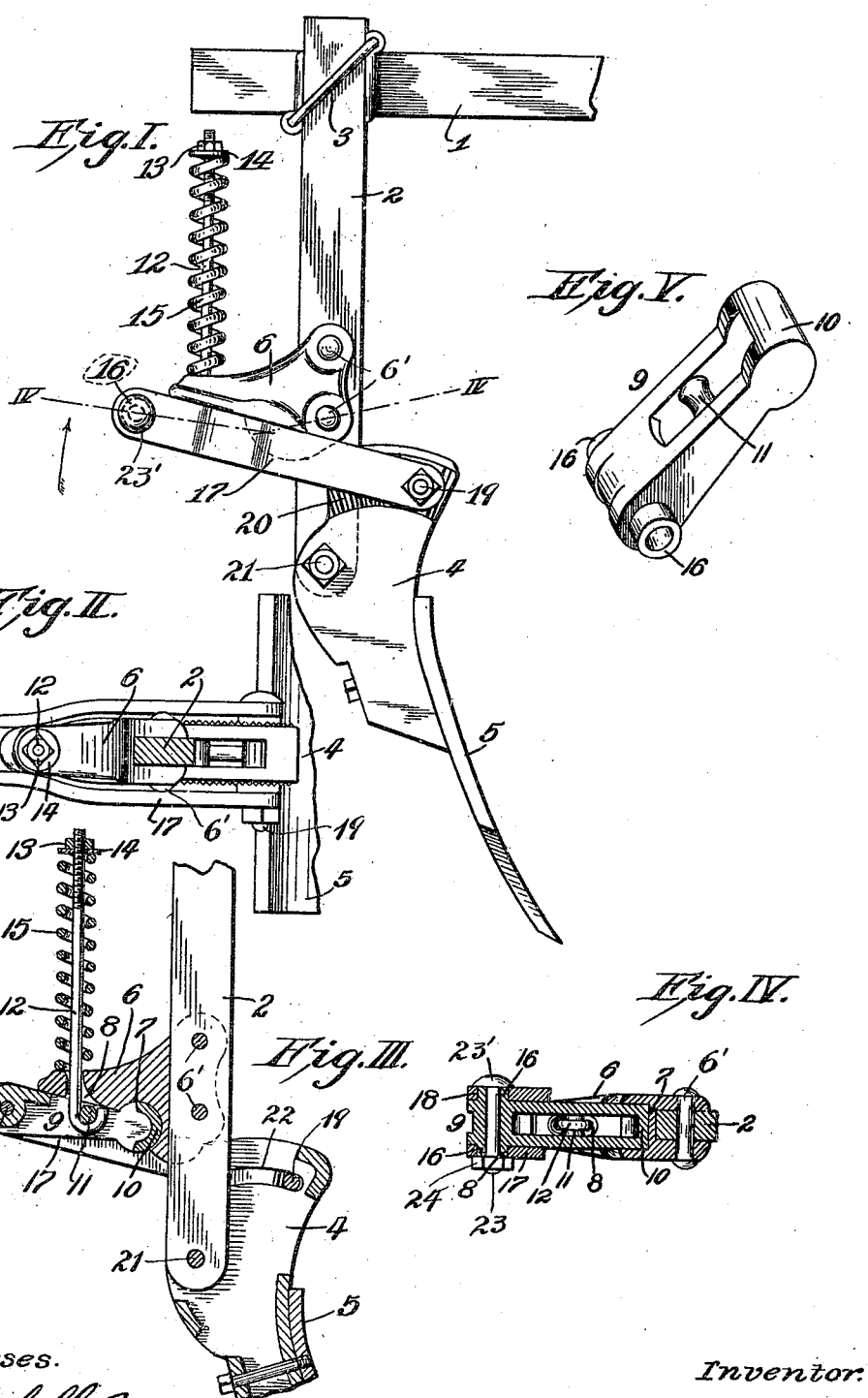
Witnesses.
Inventor.
Charles C. Flambo
By
Attorney.

UNITED STATES PATENT OFFICE.

CHARLES C. FLAMBO, OF KANSAS CITY, KANSAS, ASSIGNOR TO EAGLE MANUFACTURING COMPANY, OF KANSAS CITY, MISSOURI, A CORPORATION OF MISSOURI.

SPRING-TRIP.

959,727. Specification of Letters Patent. Patented May 31, 1910.

Application filed April 14, 1909. Serial No. 489,885.

*To all whom it may concern:*

Be it known that I, CHARLES C. FLAMBO, a citizen of the United States, residing at Kansas City, in the county of Wyandotte and State of Kansas, have invented certain new and useful Improvements in Spring-Trips; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to spring trips, and has for its principal object to provide a device of that class for normally retaining a cultivator shovel in set position and against the tension of which the shovel may yield when a solid obstruction is met.

It is a further object of my invention to provide the improved details of structure which will presently be fully described and pointed out in the claims, reference being had to the accompanying drawings, in which like reference numerals refer to like parts throughout the several views, and in which:—

Figure I is a side view of a spring trip constructed according to my invention, illustrating its application to a cultivator. Fig. II is a plan view of same. Fig. III is a longitudinal sectional view of the spring trip and a portion of a shovel. Fig. IV is a cross sectional view on the line IV—IV, Fig. I. Fig. V is a detail view of the rocker arm which forms part of the device.

In referring more in detail to the parts, I will, for the purpose of more clearly illustrating my improvements, describe same as applied to a cultivator, with the understanding that the cultivator parts, in themselves, form no part of my present invention, and that the spring trip is not limited in its use to a combination with such parts.

1 designates a shovel beam, and 2 a bar which is adjustably mounted on the beam by means of a clamp 3. Pivotally mounted on the lower end of the bar 2 upon a bolt 21 is a shank 4, which carries a shovel blade 5. Rigidly secured to the bar 2, above shank 4 by means of rivets 6', is a rearwardly projecting bracket 6. Bracket 6 is provided, near its base, with an outwardly and downwardly opening socket 7, which is circular in contour. Near its outer end bracket 6 is provided with an aperture 8, the inner edge of which is rounded backwardly toward the socket 7.

9 designates a rocker arm, which is preferably skeleton in formation and has a head 10 that is adapted to revolve within the socket 7. Carried by and extending between the sides of the rocker arm is a pin 11. Projecting through the aperture 8, in bracket 6, is a rod 12, the lower end of which is hooked on the pin 11, while its upper end extends above the bracket and is threaded to carry a nut 13.

14 designates a washer, which is carried by the rod 12, and 15 a coil spring which surrounds said rod and bears against the top of the bracket and against the washer, the latter being held by the nut 13. The spring is normally under tension when on the rod, so that the rocker arm is yieldingly held against the under side of the bracket.

Projecting laterally from the outer end of the arm 9 are the bosses 16. Mounted on each side of the shovel shank is a link 17, the outer end of which is provided with an aperture 18 into which one of the bosses 16 is projected and in which said boss is adapted to revolve. Passing through the member 9 is a bolt 23, having a large head 23' and a nut 24. The diameters of said head and nut are sufficiently large to retain the links 17 close against the member 9. The forward ends of the links are preferably adjustable on the shovel shank so that the shovel may be set at an angle best adapted for the work desired.

Shank 4 is provided with an arcuate slot 22, through which the bolt 19 passes. The slot provides for setting the plow at different angles, which is effected by first loosening the nut of bolt 19 and setting the shank 4 as desired. The center of curvature of said slot is eccentric to the pivot 21, so that the angle of the arms 17 shall be suitably varied to accord with any angle at which the plow is adjusted, the object being to maintain equal leverage of the plow upon the rocker 6 and spring 15.

In the use of a cultivator equipped with a spring trip, constructed according to my invention, the parts are assembled as described and the apparatus propelled in the usual manner. Under ordinary conditions the shovel will travel through the soil without rocking the arm 9, but should a root or other obstruction be encountered, the shovel blade will hold thereagainst and rock the shank 4 on its pivot 21. As the upper end of the shovel shank rocks forwardly, it carries the links 17 therewith and draws the rocker arm 9 downwardly, the arm head 10 turning in the socket, in the bracket 6, and the rod 12 being pulled downwardly against the tension of the spring 13 because of its connection with the pin 11. By yielding backwardly the shovel may pass over the obstruction without breaking and will be returned to its original position by the spring 13.

By providing a head 10 and bosses 16 of substantial area, the tendency of the bearing to wear through is greatly diminished and the life of the trip prolonged. In similar devices, certain parts become rapidly worn and are frequently broken, which is obviated by my improved details of structure.

Having thus described my invention, what I claim as new therein and desire to secure by Letters-Patent is:—

1. In a spring trip a bracket having a concaved socket, a rocker arm comprising a head having frictional connection with the socketed portion of said bracket, bosses projecting laterally from said arm, a pivoted shank, links connected with said shank and provided with apertures adapted for receiving said bosses, and a spring member carried by said bracket and connected with said arm.

2. The combination of a suitable bar, a bracket rigidly mounted on said bar and provided with a concaved socket and an aperture, a shovel shank pivotally mounted on said bar, a socket arm, having a head revolubly mounted in the socket in said bracket, a rod connected with said arm and projecting through the aperture in said bracket, a keeper on said rod, a spring surrounding said rod and bearing against said keeper and bracket, and a link pivotally connecting the outer end of said arm with the shovel shank, substantially as and for the purpose set forth.

In testimony whereof I affix my signature in presence of two witnesses.

CHARLES C. FLAMBO.

Witnesses:
MYRTLE M. JACKSON,
E. A. CAHILL.